March 14, 1967 B. GRANCOIN 3,309,642
HALL EFFECT ROTATING DEVICE
Filed July 1, 1964 2 Sheets-Sheet 1

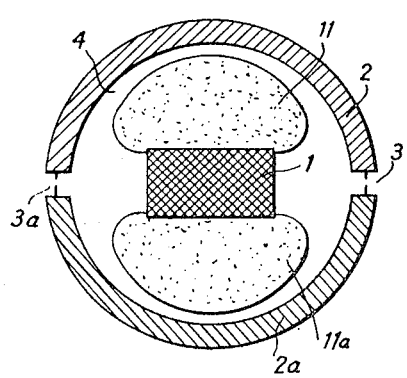
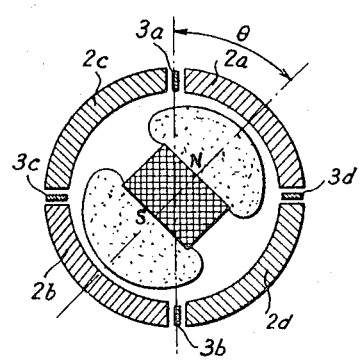
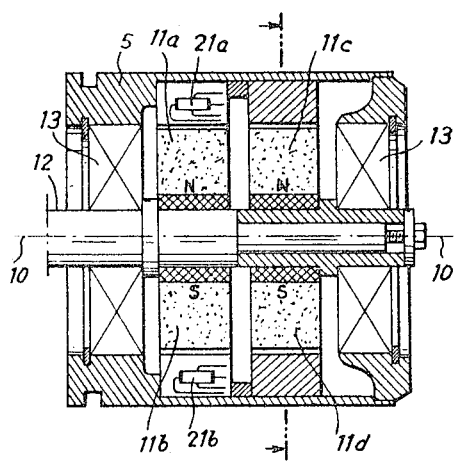
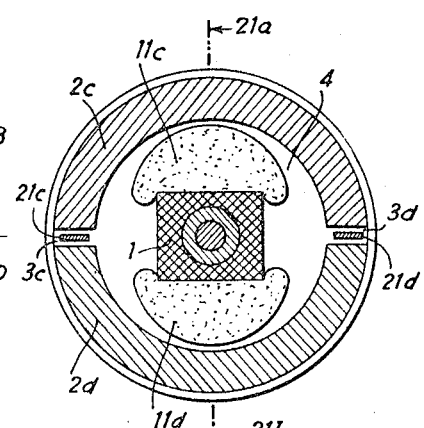

United States Patent Office 3,309,642
Patented Mar. 14, 1967

3,309,642
HALL EFFECT ROTATING DEVICE
Bernard Grancoin, Paris, France, assignor to CSF—
Compagnie Generale de Telegraphie Sans Fil, a corporation of France
Filed July 1, 1964, Ser. No. 379,525
Claims priority, application France, July 5, 1963, 940,535
5 Claims. (Cl. 338—32)

The present invention relates to devices which translate into electrical signals angle values or trigonometrical data, as used in particular in resolvers or computers.

Such devices generally comprise stator and rotor windings and necessitate the use of slip-rings and brushes. The sparking inherent to the operation of such devices may be detrimental to a correct operation of certain angle measuring or calculating systems. In addition such devices are extremely space consuming.

It is an object of the invention to avoid these drawbacks.

To this end the invention provides a device wherein inductor windings are substituted by a rotor magnet and the stator winding by Hall probes.

The invention will be better understood from the following description and appended drawing wherein:

FIGS. 5 to 10 show modifications.

Figure 1:
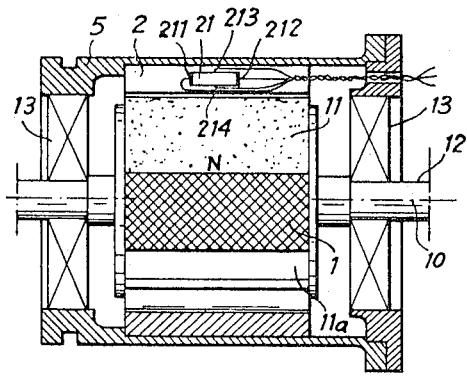
FIGS. 1 and 2 are respectively a sectional and a cross-sectional view of a device according to the invention.
Figure 2:
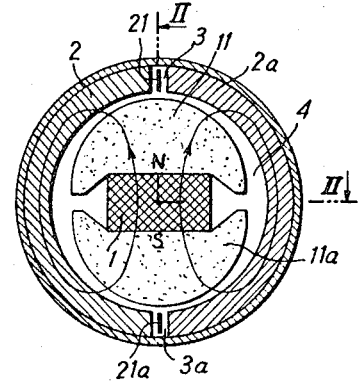

The device shown in FIGS. 1 and 2, comprises a permanent magnet rotor having two poles 11 and 11a and a stator separated from the rotor by an air-gap 4.

The stator is formed by two shells 2 and 2a separated from each other by diametrally opposed air gaps 3 and 3a. One or more Hall probes 21 and 21a are placed in gaps 3 and 3a. Pole pieces 11 and 11a and shells 2 and 2a are preferably made of soft magnetic material.

The rotor is mounted on a shaft 12 which rotates about its axis 10 in a ball-bearing 13 positioned in a frame 5.

In FIG. 2, the North-South axis of the magnet 1 lies along air gaps 3 and 3a.

In this position of the rotor, the flux of magnet 1 is equally divided between the two shells 2 and 2a. There is no flux in air gaps 3 and 3a and accordingly no voltage is collected at the terminals 213 and 214 of probes 21 and 21a, whatever the current applied to terminals 211 and 212 of these probes. This is the zero position.

Figure 3:
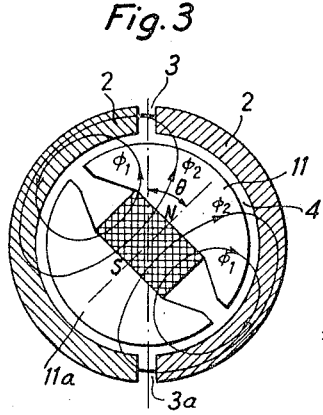
FIG. 3 shows the rotor in cross-section in another position.

In FIG. 3, the North-South axis of magnet 1 makes an angle $\theta$ with the zero position. In this position, a portion $\Phi_1$ of the flux does not cross air-gaps 3 and 3a, while another portion $\Phi_2$ of the flux crosses air gaps 3 or 3a, thereby exciting probes 21 and 21a.

Ratio of $\Phi_1$ to $\Phi_2$ is a function of the angular position $\theta$ of the rotor. In particular, for $$\theta = \frac{\pi}{2}$$

Figure 4:
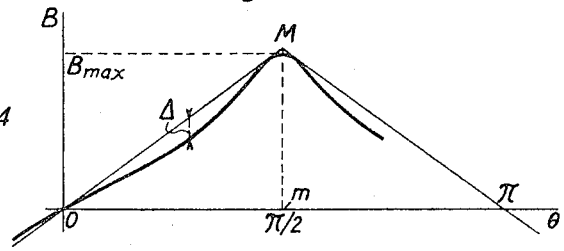
FIG. 4 is a plot showing the output of the device of the invention.

$\Phi_1 = 0$ and $\Phi_2$ is a maximum, as shown in FIG. 4.

If a constant current is applied to the probe electrodes 211 and 212, the voltage appearing between their electrodes 213–214 is proportional to the magnetic induction B, i.e. is a linear function of the rotor angular position $\theta$. However, with the rotor configuration shown in FIGS. 2 and 3, where the poles are bounded by a cylindrical surface of revolution about axis 10, this linearity could not be adequate.

The reluctance which opposes flux $\Phi$, comprises the radial gap 4 between the rotor poles 11–11a and the stator. This reluctance is a function of angle $\theta$.

The reluctance which opposes flux $\Phi_2$ comprises the fixed reluctance of air gaps 3 and the reluctance of the radial air gap 4, which varies as a function of $\theta$. The total reluctance results from these two reluctances, plus the leakage reluctance in parallel. Flux $\Phi_2$, and therefore the magnetic induction B, are thus a function of $\theta$, but not quite a linear function, the variation law being rather involved. The maximum departure $\Delta$ from straight line OM, shown in FIG. 4 and corresponding to a linear law is found to be in the direction below the line.

The relative error $$\epsilon = \frac{\Delta}{mM}$$

is a function of the dimension and the magnetic characteristics, in particular of the magnet reversible permeability, the poles air gap and leakage percentage.

Figure 5:
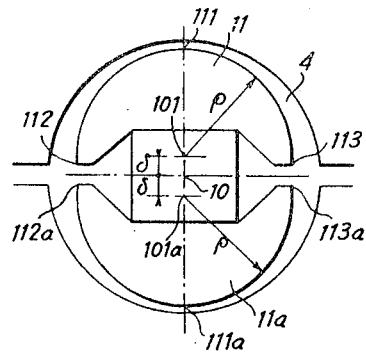

In order to minimize the error, the poles are shaped as shown in FIG. 5. The radial air gap is a minimum along the axis of the poles at 111 and 111a and increases to reach a maximum value at the tips of the polar pieces at 112–113 and 112a–113a.

The ideal pole shape may be deduced by calculation, but would result in an intricate and hardly feasible structure. An arc of circle slightly out of centre may be used with an acceptable error.

The following data apply to the example illustrated FIG. 5:

|  | Mm. |
|---|---|
| Outer diameter of the stator frame | 25 |
| Inner diameter of the stator | 17 |
| Maximum air gap 4 | 1 |
| Air gap 3 | 0.5 |
| Offset 10–101 | 1 |
| Radious $\rho$ | 6.8 |

Error of the order of 0.002.

The invention will now be applied to the resolver technique, a resolver being a device which receives an angle value and provides voltage proportional to the sine or the cosine of this angle.

The resolver shown in FIG. 6 has generally the same structure as the device shown in FIG. 2. However, the poles have a particular configuration, as shown, to provide at the outputs of the Hall probes a voltage proportional to sine or cosine $\theta$.

Some embodiments providing $\sin \theta$ and $\cos \theta$ will now be described.

In the embodiments of FIG. 7, the stator is divided into four quadrants 2a, 2b, 2c, 2d providing a magnetic induction proportional to $\sin \theta$ in the air gaps 3a and 3b and to $\cos \theta$ in the air gaps 3c and 3d.

It may be difficult to have the air gap pairs 3c–3d normal to the air gap 3a–3b and this may result in errors.

Figure 8:
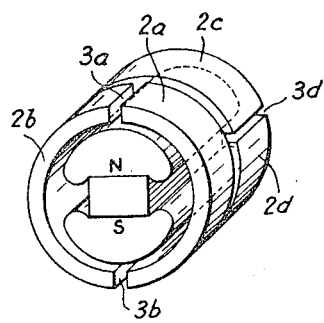

One way to avoid this trouble is to double the rotor length as shown in FIG. 8 and associate it with two pairs of stator half shells 2a, 2b and 2c, 2d, the clearance between said two pairs of half shells being great enough with respect to gap 3, in order to avoid leakage flux from one pair to the other.

Perpendicularity between air gaps 3a, 3b and 3c, 3d must be achieved with precision.

The same result may be achieved still better by using two magnets with respective pole pieces 11a, 11b and 11c, 11d as shown in FIGS. 9 and 10 which magnets can be angularly adjusted with respect to each other.

Of course the invention is not limited to the embodiments shown which were given solely by way of example.

What is claimed, is:

1. A device for translating into electrical signals, angular and trigonometrical data comprising: a stator having at least a pair of diametrally opposed air gaps separating said stator into at least two identical shells; Hall probes disposed in said air gaps with their major planar surfaces parallel to said diameter; means for applying a constant to said Hall probes, means for collecting output voltages at said Hall probes; and a rotor rotatably mounted within said stator, coaxial with said stator and comprising a permanent magnet having two pole pieces made of a soft magnetic material.

2. A device for translating into electrical signals, angular data comprising: a stator having at least two identical shells; at least a pair of diametrally opposed air gaps separating said shells from each other; Hall probes disposed in said air gaps, with their major planar surfaces parallel to said diameter, a rotor rotatably mounted within said stator, coaxial with said stator and comprising a permanent magnet having two pole pieces of a soft magnetic material; said stator being in the form of a body of revolution, having an axis; said pole pieces being bounded by portions of surface of revolution about said axis; means for applying a constant current to said Hall probes; and means for collecting output voltages at said Hall probes.

3. A device for translating into electrical signals, angular data comprising: a stator having two identical shells; two diametrally opposed air gaps separating said two shells from each other; Hall probes respectively disposed in said air gaps with their major planar surfaces parallel to said diameter; means for applying a constant current to said Hall probes; a rotor rotatably mounted within said stator, coaxial with said stator and comprising a permanent magnet having two pole pieces made of a soft magnetic material; said stator being in the form of a body of revolution having an axis, said pole pieces having respective bounding cylindrical surfaces, the axis of which is parallel to said axis and in symmetrical relationship with said axis; and means for collecting at the output of said Hall probes a voltage, proportional to angle of rotation of said rotor.

4. A resolver for translating into electrical signals, the cosine and the sine of an angle, said angle being simulated by the relative position of a rotor and a stator, comprising: a stator having four identical shells, two pairs of diametrally opposed air gaps separating respectively said four shells from each other, the diameter along which one pair is situated being perpendicular to that along which the other pair is situated; four Hall probes, respectively disposed in said four air gaps with their major planar surfaces parallel to said respective diameters passing through said air gaps; said stator having an axis of revolution; a rotor rotatably mounted about said axis of revolution and within said stator; said rotor comprising a permanent magnet and two pole pieces made of a soft magnetic material, having identical shape and size, and forming with said shells respective air gaps radially increasing with the distance to the vertex of said pole pieces increasing, for the peaks of said pole pieces to be rounded near the edges of said magnet; means for applying a constant current to said Hall probes; and means for collecting at said probes taken by pairs respective output voltages proportional to the sine and the cosine of the angle of rotation of said rotor.

5. A resolver for translating into electrical signals, the cosine and the sine of an angle, said angle being simulated by the relative position of a rotor and a stator, comprising: a stator having an axis of revolution, two identical portions, coaxial with said axis, each of said portions having two identical shells and a pair of diametrally opposed air gaps separating said shells from each other, the diameter along which one pair is situated being perpendicular to that along which the other pair is situated; four Hall probes respectively disposed in said air gaps with their major planar surfaces parallel to said respective diameters passing through said air gaps; said rotor being rotatably mounted about said axis of revolution; within said stator, coaxial with said stator and having two portions, inside said two stator portions respectively; said rotor comprising a permanent magnet and at least two pole pieces made of a soft magnetic material, having identical shape and size and forming with said shells respective air gaps radially increasing with the distance to the vertex of said pole pieces increasing, for the peaks of said pole pieces to be rounded near the edges of said magnet; means for applying a constant current to said Hall probes; and means for collecting at said probes taken by pairs respective output voltages proportional to the sine and the cosine of the angle of rotation of said rotor.

References Cited by the Examiner
UNITED STATES PATENTS

| 2,512,325 | 6/1950 | Hansen. | |
| 2,536,805 | 1/1951 | Hansen. | |
| 3,018,395 | 1/1962 | Carlstein. | |
| 3,112,464 | 11/1963 | Ratajski et al. | 338—32 |
| 3,162,805 | 12/1964 | Robertson | 338—32 X |
| 3,194,990 | 7/1965 | Kendall | 338—32 X |

RICHARD M. WOOD, *Primary Examiner.*

W. D. BROOKS, *Assistant Examiner.*